US007988550B2

(12) United States Patent
White

(10) Patent No.: US 7,988,550 B2
(45) Date of Patent: Aug. 2, 2011

(54) SYSTEM, METHOD, AND APPARATUS FOR PROCESSING WAGERING GAME VOUCHER IMAGES

(75) Inventor: Michael L. White, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 1211 days.

(21) Appl. No.: 11/275,321

(22) Filed: Dec. 22, 2005

(65) Prior Publication Data

US 2006/0258439 A1 Nov. 16, 2006

Related U.S. Application Data

(60) Provisional application No. 60/640,931, filed on Dec. 31, 2004.

(51) Int. Cl.
*A63F 9/24* (2006.01)
*A63F 13/00* (2006.01)
*G06F 15/00* (2006.01)
*G06K 7/10* (2006.01)

(52) U.S. Cl. ................ 463/25; 463/29; 463/42; 463/47; 235/384; 235/458; 358/1.12

(58) Field of Classification Search .................... 463/25, 463/29, 42, 47; 358/1.12; 235/384, 458
See application file for complete search history.

(56) References Cited

U.S. PATENT DOCUMENTS

| | | | | |
|---|---|---|---|---|
| 4,496,830 | A * | 1/1985 | Yoshihara et al. | 235/458 |
| 6,538,757 | B1 * | 3/2003 | Sansone | 358/1.12 |
| 6,732,920 | B2 | 5/2004 | Gatto et al. | |
| 6,736,725 | B2 * | 5/2004 | Burns et al. | 463/25 |
| 6,800,029 | B2 * | 10/2004 | Rowe et al. | 463/25 |
| 7,017,806 | B2 * | 3/2006 | Peterson | 235/384 |
| 7,331,520 | B2 | 2/2008 | Silva et al. | |
| 2003/0090699 | A1 | 5/2003 | Meyerhofer et al. | |
| 2003/0141359 | A1 | 7/2003 | Dymovsky et al. | |
| 2004/0132529 | A1 * | 7/2004 | Mkrtchyan et al. | 463/29 |
| 2004/0186799 | A1 * | 9/2004 | Dunn et al. | 705/30 |
| 2004/0204233 | A1 | 10/2004 | Saffari et al. | |
| 2004/0206601 | A1 | 10/2004 | Heidel | |
| 2004/0214643 | A1 | 10/2004 | Parrott et al. | |

* cited by examiner

*Primary Examiner* — Melba Bumgarner
*Assistant Examiner* — Frank M Leiva
(74) *Attorney, Agent, or Firm* — Schwegman, Lundberg & Woessner, P.A.

(57) ABSTRACT

A system, method, and apparatus for processing gaming voucher images are described herein. In one embodiment, the method includes recording voucher information on a gaming voucher, creating an image of the gaming voucher, causing the image to be stored, and dispensing the gaming voucher.

16 Claims, 9 Drawing Sheets

800

802 804 806 808

| VOUCHER_ID | VOUCHER INFORMATION | DISPENSE-TIME IMAGE | REDEMPTION-TIME IMAGE |
|---|---|---|---|
| V1 | V1 INFO | V1G.JPG | V1R.JPG |
| V2 | V2 INFO | V2G.JPG | V2R.JPG |
| V3 | V3 INFO | V3G.JPG | |

810

FIG. 8

SYSTEM, METHOD, AND APPARATUS FOR PROCESSING WAGERING GAME VOUCHER IMAGES

RELATED APPLICATION

This application claims priority under 35 U.S.C. 119(e) from U.S. Provisional Application Ser. No. 60/640,931 filed Dec. 31, 2004, which application is incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, WMS Gaming, Inc.

FIELD

This invention relates generally to the field of wagering game machine data processing and more particularly to the field of wagering game machine voucher image processing.

BACKGROUND

Wagering game machine manufacturers and casinos have recently introduced cashless wagering game machines. Cashless wagering game machines typically award gaming vouchers, which can be redeemable for cash or can be used to transfer credits from the voucher to a cashless equipped wagering game machine. These cashless equipped wagering game machines typically are connected in a network to a central server that authenticates the voucher and transfers the credits represented on the voucher to the selected wagering game machine. The central server for the cashless gaming system typically includes a database reflecting each voucher's unique identification number and credit value.

For example, when a player "cashes-out" on a cashless wagering game machine, the wagering game machine may present the player with a gaming voucher. The player may redeem the voucher for cash at a cashier's cage or use the voucher to play another wagering game machine. To play another wagering game machine, the player typically inserts the gaming voucher into the wagering game machine's voucher acceptor and bets credits associated with the voucher. When the player cashes-out, the wagering game machine retains the original gaming voucher and presents a new gaming voucher to the player.

Some jurisdictions have regulations requiring the retention of the hard copy gaming vouchers retained by each wagering game machine for recordkeeping purposes. Although the cashless gaming central server stores all of the information contained on the voucher in a digital format, gaming regulators in many jurisdictions want to have the capability to view the actual voucher. The hardcopy voucher provides an additional check of the integrity of the cashless gaming database.

Gaming vouchers are generally stored in warehouses, and over a number of years, considerable storage expenses can be incurred. In addition to this storage expense, retrieving specific vouchers can be an expensive and laborious process because of the sheer number of hard copy vouchers that must be manually sorted.

BRIEF DESCRIPTION OF THE FIGURES

The present invention is illustrated by way of example and not limitation in the Figures of the accompanying drawings in which:

FIG. 8 is a diagram illustrating a gaming voucher image database table, according to exemplary embodiments of the invention.

DESCRIPTION OF THE EMBODIMENTS

System, method, and apparatus for processing wagering game voucher images are described herein. This description of the embodiments is divided into four sections. The first section describes a system overview. The second section describes an exemplary operating environment and system architecture. The third section describes system operations and the fourth section provides some general comments.

Overview

This section provides a broad overview of a gaming voucher imaging system, according to exemplary embodiments of the invention. While this section describes dataflow attendant to capturing and processing gaming voucher images, the next sections describe additional features and embodiments.

Figure 1:
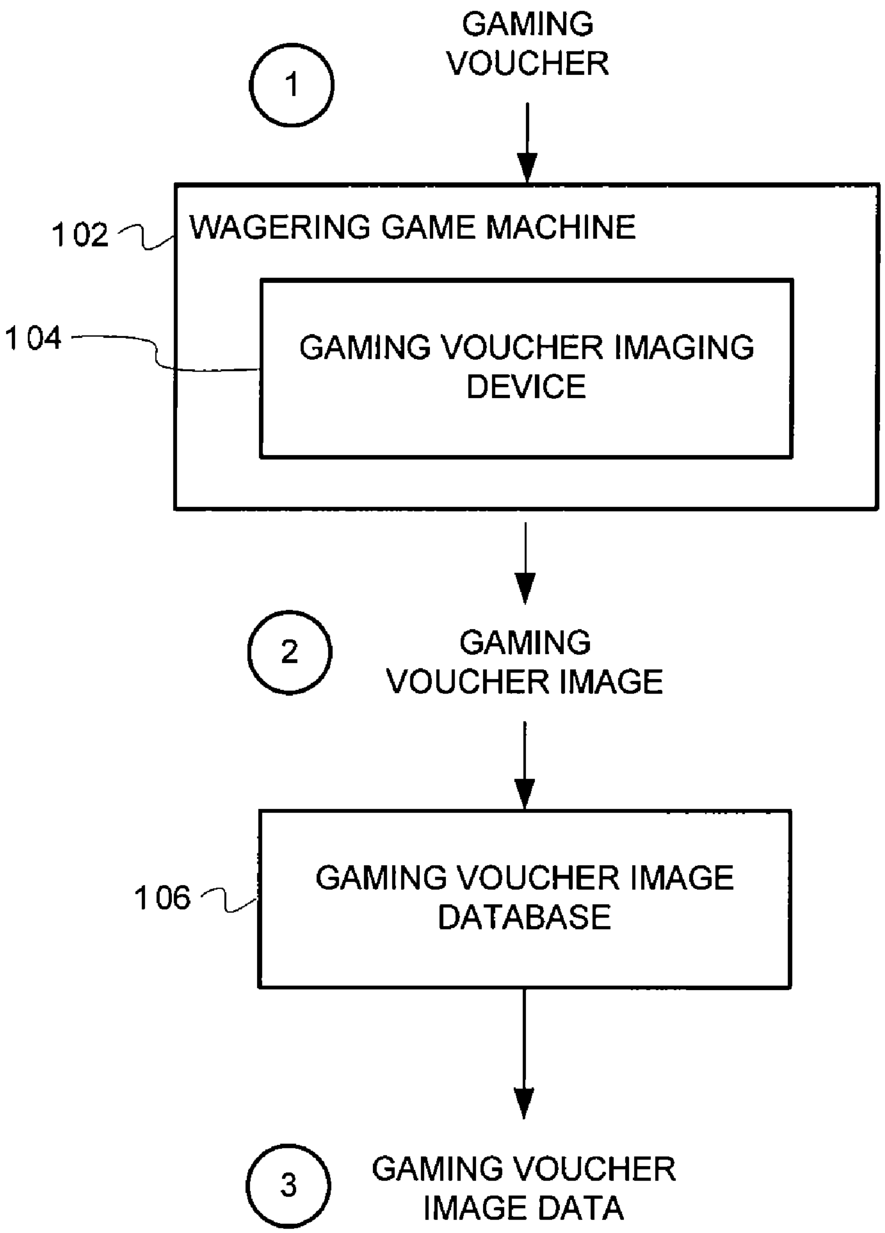
FIG. 1 is a dataflow diagram illustrating dataflow associated with capturing and processing voucher images, according to exemplary embodiments of the invention.

FIG. 1 is a dataflow diagram illustrating dataflow associated with capturing and processing voucher images, according to exemplary embodiments of the invention. In FIG. 1, the dataflow is divided into three stages.

At stage one, a wagering game machine 102 receives a gaming voucher. The wagering game machine's gaming voucher imaging device 104 (e.g., a digital camera or document scanner) captures an image of the gaming voucher. In addition to capturing the image, the gaming voucher may be scanned for machine-readable indicia. Machine-readable indicia include linear barcodes and two-dimensional barcodes. Barcode readers, typically using low-power laser illumination, convert the barcode patterns into digital data for transmission and storage in a database. The bar coded data on cashless gaming vouchers typically includes a unique identification number that may serve as a voucher identifier for finding an associated database record. The imaging device 104 may incorporate the barcode reader function to eliminate the need for a separate barcode reader. The data collected by the imaging device 104 may be further analyzed with appropriate software to identify the barcode and the digital data it represents. Alternatively, two separate devices (the imaging device and the barcode reader) may be used to capture the image of the voucher and convert the machine-readable indicia contained on the voucher to a digital equivalent.

At stage two, the wagering game machine 102 transmits the gaming voucher image for storage in the gaming voucher image database 106. The gaming voucher image database 106 may be housed, for example, on a central server. The gaming voucher image can be represented in any suitable data format, such as Joined Photographic Experts Group (JPEG), bitmap, Tagged Image File Format (TIFF), etc. Additionally, the digital equivalent of the machine-readable indicia is transmitted by the wagering game machine 102 to a central server for storage in a cashless database. If desired, the image database 106 and the cashless database may be incorporated as a single database. The identification number of the gaming voucher may be directly linked to the image, facilitating the search and retrieval of specific voucher images.

At stage three, the gaming voucher image database 106 transmits the gaming voucher image for further processing. In one embodiment, the gaming voucher image database can transmit the gaming voucher image to another system component (e.g., wagering game machine, accounting server, etc.) for comparison with another gaming voucher image. The image comparison can be part of a process for validating gaming vouchers received by wagering game machines or voucher redemption devices. Wagering game machines and voucher redemption devices can accept or reject gaming vouchers based on the image comparison results. Additionally, gaming regulators can inspect images in the gaming voucher image data base 106 for accounting, verification, or other purposes.

System Architecture and Operating Environment

This section describes an exemplary system architecture for a processing gaming voucher images in a wagering game machine. This section also describes an exemplary operating environment in which embodiments of the invention can be practiced. The operation of the system components will be described in the next section.

Figure 2:
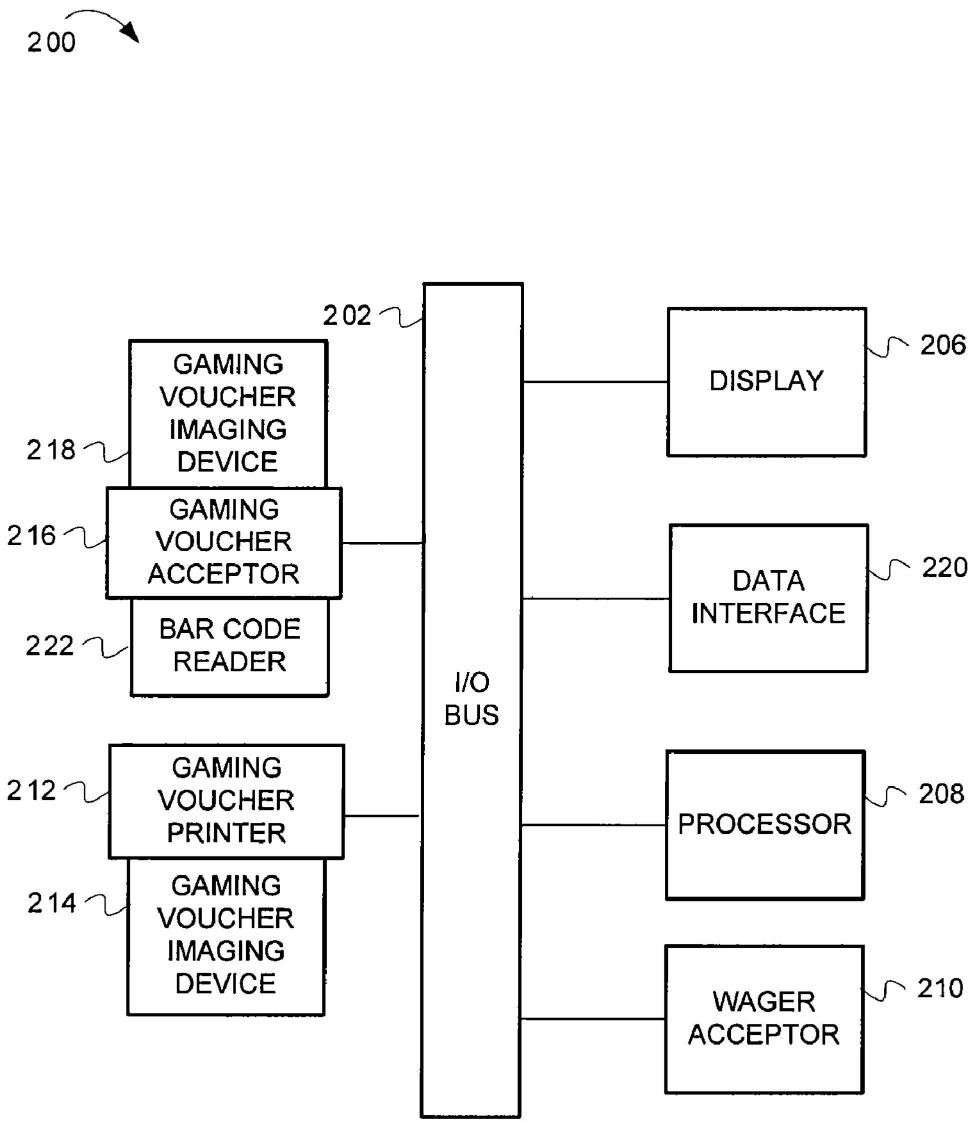
FIG. 2 is a block diagram illustrating a wagering game machine capable of processing gaming voucher images, according to exemplary embodiment of the invention.

FIG. 2 is a block diagram illustrating a wagering game machine capable of processing gaming voucher images, according to exemplary embodiments of the invention. In FIG. 2, the wagering game machine 200 includes a processor 208, display device 206, data interface unit 220, and wager acceptor 210, all connected to an input/output bus 202. The input/output bus 202 is connected to a gaming voucher printer 212, which is connected to a gaming voucher imaging device 214. The input/output bus 202 is also connected to a gaming voucher acceptor 216, which is connected to a gaming voucher imaging device 218 and bar code reader 222.

In the wagering game machine 200, the processor 208 can perform operations for conducting a wagering game (e.g., slots, video blackjack, roulette, etc.). In one embodiment, the processor 208 conducts the wagering game by executing software or other instructions stored on a machine-readable medium. The wager acceptor 210 allows players to wager value on an outcome of the wagering game. The display device 206 can display game states and game results. The data interface unit 220 can exchange data with any suitable external device, such as a network server (not shown).

The gaming voucher acceptor 216 includes a mechanism for accepting gaming vouchers. The bar code reader 222 can read machine-readable indicia from gaming vouchers and it can convert the machine-readable indicia into a digital equivalent. The gaming voucher imaging device 218 captures images of the gaming vouchers. In one embodiment, the system 200 transmits the gaming voucher images through the data interface unit 220.

The gaming voucher printer 212 prints and dispenses gaming vouchers when players "cash-out." After the gaming voucher printer 212 prints a gaming voucher, the gaming voucher imaging device 214 can create an image of the gaming voucher while it is still retained within the gaming voucher printer. The wagering game machine 200 can transmit the gaming voucher image via the data interface unit 220 for storage on an external device (not shown).

It has become common industry practice to scan the machine-readable indicia of newly printed vouchers prior to disbursement to verify that the data imprinted on the voucher is the same as the data used to create the printed image generally to ensure that the printed voucher is not defective. As noted above, the imaging device 104 may incorporate the barcode reader function to eliminate the need for a separate barcode reader. Using imaging devices to read the voucher before it is disbursed to the player and after it is redeemed allows the voucher images to be compared to detect fraudulent activity.

Figure 3:
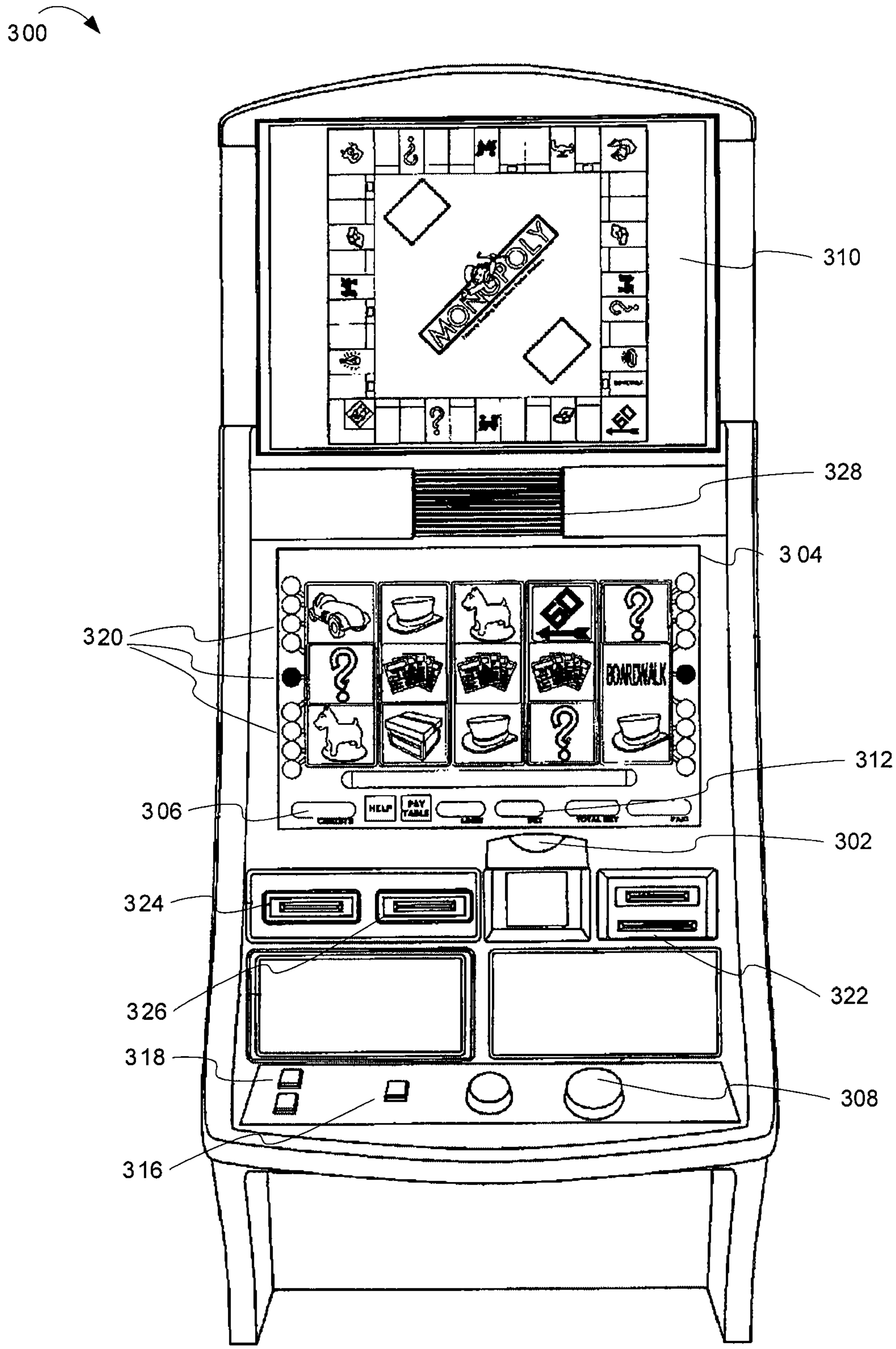
FIG. 3 is an orthogonal view of a wagering game machine, according to exemplary embodiments of the invention.

While FIG. 2 describes an architecture for a wagering game machine that can process gaming voucher images, FIG. 3 provides additional details about wagering game machines.

FIG. 3 is an orthogonal view of a wagering game machine, according to exemplary embodiments of the invention. Although not shown, the wagering game machine 300 can include some or all the components described above (see discussion of FIG. 2).

In FIG. 3, the wagering game machine 300 can be a computerized slot machine having the controls, displays, and features of a conventional slot machine. The wagering game machine 300 can be operated while players are standing or seated. However, it should be appreciated that the wagering game machine 300 can be constructed as a pub-style tabletop game (not shown), which a player can operate while sitting. Furthermore, the wagering game machine 300 can be constructed with varying cabinet and display designs. The wagering game machine 300 can incorporate any primary game such as slots, poker, or keno, and additional bonus round games. The symbols and indicia used on and in the wagering game machine 300 can take mechanical or video form.

As illustrated in FIG. 3, the wagering game machine 300 includes a card reader 322 for accepting player tracking cards. Player tracking cards can include player preferences and other information about the player. The wagering game machine 300 also includes a coin slot 302 and a bill validator, which may also act to accept gaming vouchers. If desired, the bill validator for accepting paper currency may be separated and distinct from the voucher acceptor 324. Players can place coins in the coin slot 302 and paper money or gaming vouchers in the bill validator or gaming voucher acceptor 324. Although not shown, an imaging device can capture images of the gaming vouchers after they are received by the voucher acceptor 324. In cases where the bill validator and voucher acceptor are the same device, the imaging device may collect images of both paper currency and vouchers.

Other devices can be used for accepting payment. For example, credit/debit card readers/validators can be used for accepting payment. Additionally, the wagering game machine 300 can perform electronic funds transfers and financial transfers to procure monies from house financial accounts.

When players deposit value into the wagering game machine 300, a number of credits corresponding to the deposit are shown in a credit display 306. After depositing the appropriate amount of money, players can begin playing the game by pushing a play button 308. The play button 308 can be any play activator used for starting a wagering game or sequence of events in the wagering game machine 300.

As shown in FIG. 3, the wagering game machine 300 also includes a bet display 312 and a "bet one" button 316. Players can place bets by pushing the "bet one" button 316. Players can increase their bets by one credit by pushing the "bet one" button 316. When players push the "bet one" button 316, the number of credits shown in the credit display 306 decreases by one credit, while the number of credits shown in the bet display 312 increases by one credit.

Players can "cash-out" by pressing a cash-out button 318. When players cash-out, the wagering game machine's gaming voucher printer 326 (see also FIG. 2) may print and dispense gaming vouchers corresponding to the number of remaining credits. A gaming voucher imaging device (see FIG. 2) can capture images of the gaming vouchers before the vouchers are dispensed to players. The wagering game machine 300 may employ other payout mechanisms such as credit slips, which can be redeemable by a cashier and also can be imaged by the imaging device, or electronically recordable cards, which track player credits. The wagering game machine 300 can also dispense cash or coins.

The wagering game machine 300 also includes a primary display unit 304 and a secondary display unit 310 (also known as a "top box"). In one embodiment, the primary display unit 304 displays a plurality of video reels 320. According to embodiments of the invention, the display units 304 and 310 can include any visual representation or exhibition, including moving physical objects (e.g., mechanical reels and wheels), dynamic lighting, and video images. In one embodiment, each reel 320 includes a plurality of symbols such as bells, hearts, fruits, numbers, letters, bars, or other images, which correspond to a theme associated with the wagering game machine 300. Furthermore, as shown in FIG. 3, the wagering game machine 300 includes an audio presentation unit 328. The audio presentation unit 328 can include audio speakers or other suitable sound projection devices.

In one embodiment, a plurality of wagering game machines can be connected together with other gaming systems to form a gaming network. In one embodiment, the wagering game machine 300 can present media and data signals received from other network devices. The discussion of FIG. 4 below provides an example of such a gaming network.

Figure 4:
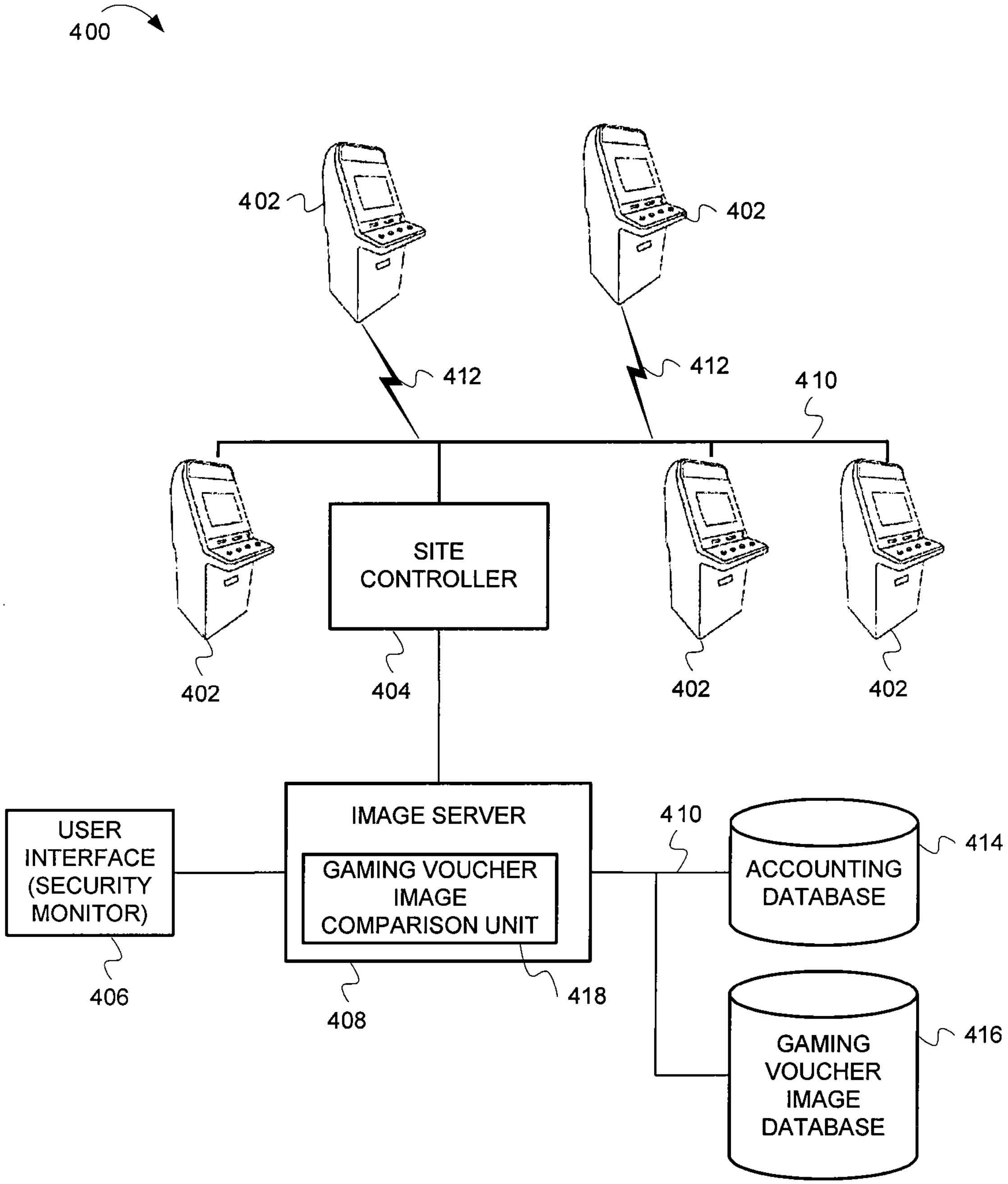
FIG. 4 is a block diagram of an exemplary gaming network, according to embodiments of the invention.

FIG. 4 is a block diagram of an exemplary gaming network, according to embodiments of the invention. Operations of the gaming network components are described in greater detail below, in the next section. As shown in FIG. 4, a wagering game network 400 includes a plurality of wagering game machines 402 and a site controller 404. The site controller 404 is connected to an image server 408, which is connected to an accounting database 414, gaming voucher image database 416, and user interface 406.

These components of the wagering game network 400 can communicate over wired connections 410 and/or wireless connections 412. The wagering game machines 402 can be connected to the wagering game network 400 using any suitable connection technology, such as Bluetooth, 802.11x, Ethernet, etc.

The wagering game machines 402 can be identical or similar to the wagering game machines of FIGS. 2 and 3. For example, the wagering game machines 402 can include gaming voucher imaging devices 212 and 218.

The site controller 404 can be located in a casino and can be used for monitoring wagering game machine information, such as amounts wagered, amounts paid-out, amounts collected, and player tracking information.

In one embodiment, the image server 408 includes an image comparison unit 418. The image server 408 receives, processes, and transmits voucher image data. Operations performed by the image server 408 are described in greater detail below. The image server 408 is connected to a user interface 406 for displaying accounting and gaming voucher image information. The image server 408 is also connected to an accounting database 414, which includes accounting information collected from the wagering game machines 402 and the site controller 404. Additionally, the image server 408 is connected to a gaming voucher image database 416, which includes gaming voucher images and data related to gaming vouchers. In one embodiment, the accounting database 414 and gaming voucher image database 416 are housed inside the image server 408.

System Operations

This section describes operations performed by embodiments of the invention. In particular, this section includes a description of operations performed by embodiments of the above-described wagering game machines and gaming network. In certain embodiments, the operations are performed by instructions residing on machine-readable media (e.g., software), while in other embodiments, the methods are performed by hardware or other logic (e.g., digital logic).

Figure 9:
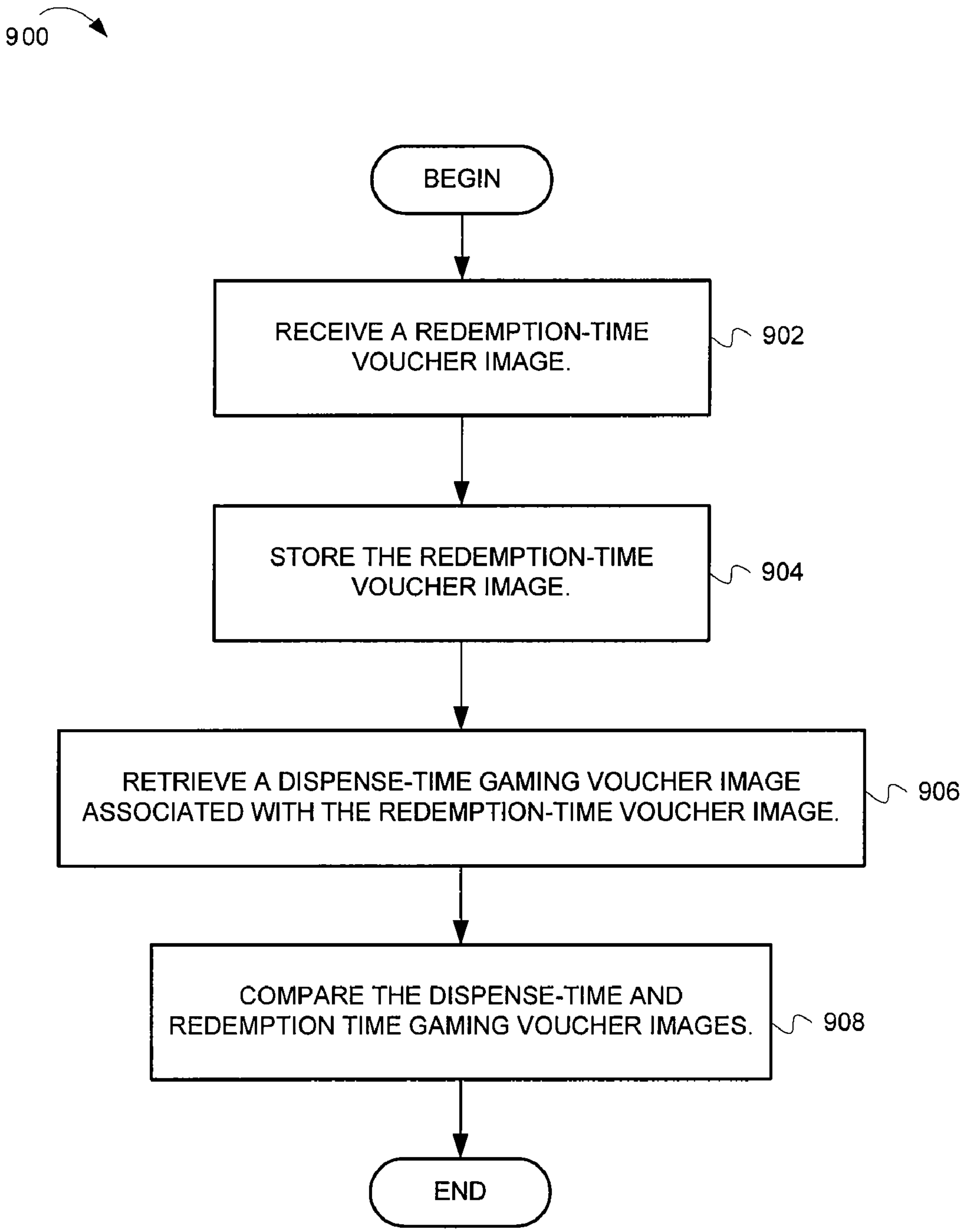
FIG. 9 is a flow diagram illustrating operations for comparing gaming voucher images, according to exemplary embodiments of the invention.

In this section, FIGS. 5-9 will be discussed. In particular, FIG. 5 describes an embodiment of a gaming voucher, while FIGS. 6-7 describe operations for creating and processing gaming voucher images. FIGS. 8-9 describe operations performed by embodiments of the image server and databases.

Figure 5:
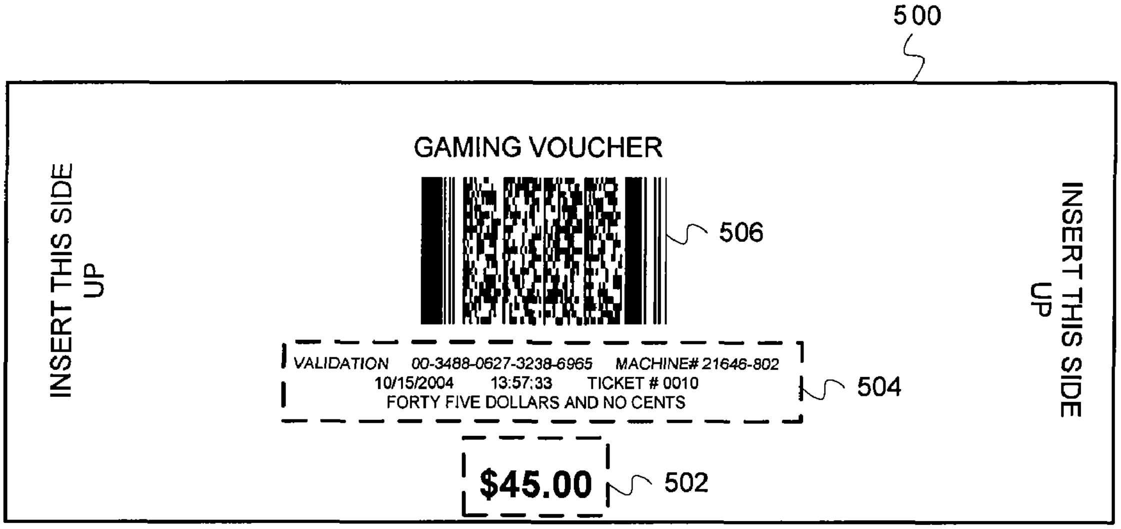
FIG. 5 is a diagram illustrating a gaming voucher, according to exemplary embodiments of the invention.

Before discussing operations for processing gaming voucher images, the discussion of FIG. 5 will describe a gaming voucher that can be used in conjunction with embodiments of the invention.

FIG. 5 is a diagram illustrating a gaming voucher, according to exemplary embodiments of the invention. In FIG. 5, the gaming voucher 500 includes a value indicator 502, which indicates a monetary value associated with the gaming voucher 500. Typically, players can redeem gaming vouchers for the value indicated by the value indicator 502. For example, a player can typically redeem the gaming voucher 500 for $45.00.

The gaming voucher 500 may also include additional alphanumeric information 504. The alphanumeric information 504 may also include information identifying the wagering game machine that dispensed the gaming voucher, information about when the gaming voucher was dispensed, and the gaming voucher's value. The alphanumeric information 504 may also include a voucher identifier, which can be used for validating the gaming voucher 500 (in addition to the voucher identifier that may be present in the machine-readable indicia).

The gaming voucher 500 may also include a bar code 506, which typically represents a unique digital identifier (e.g., a voucher identifier) of a database record containing information related to the voucher transaction—generally including voucher information. Referring to FIG. 4, in one embodiment, wagering game machines 402 can create an image of the gaming voucher 500, while the image server 408 can process the image, and the image database 416 can store the image. In one embodiment, the accounting database 414 can store information associated with the gaming voucher 500.

Next, operations for printing a gaming voucher and creating an image of the gaming voucher will be described.

Figure 6:
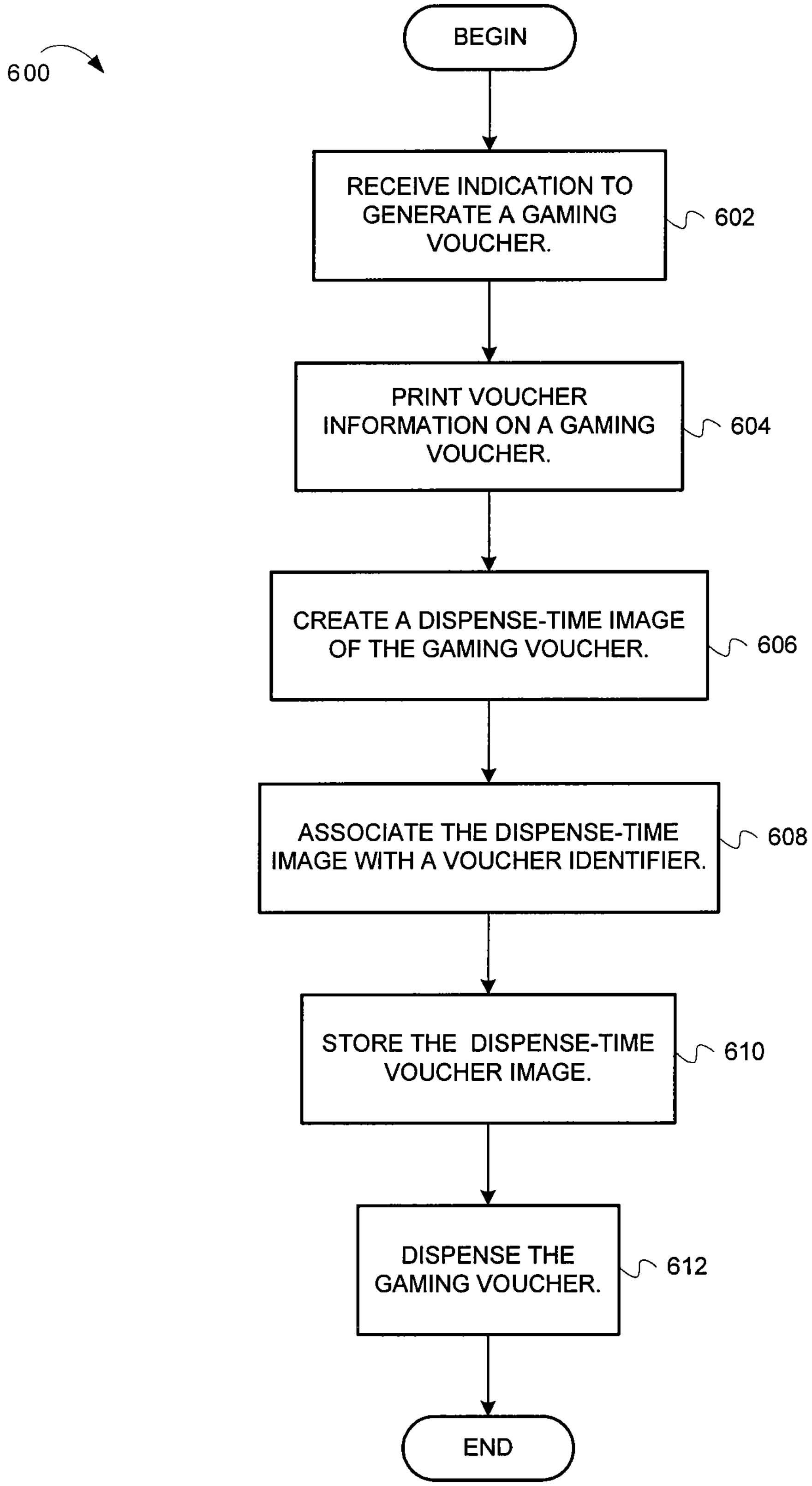
FIG. 6 is a flow diagram illustrating operations for printing and creating an image of a gaming voucher, according to exemplary embodiments of the invention.

FIG. 6 is a flow diagram illustrating operations for printing and creating an image of a gaming voucher, according to exemplary embodiments of the invention. The flow diagram 600 will be described with reference to the exemplary gaming network shown in FIG. 4. The flow diagram 600 commences at block 602.

At block 602, an indication to generate a gaming voucher is received. For example, a wagering game machine 402 receives an indication that a player wants to "cash-out." The flow continues at block 604.

At block 604, voucher information is printed on a gaming voucher. For example, a wagering game machine's gaming voucher printer 212 prints a bar code, alphanumeric information, and value amount on a gaining voucher. The flow continues at block 606.

At block 606, a dispense-time image of the gaming voucher is created. For example, the gaming voucher imaging device 214 creates an image of the gaming voucher. In one embodiment, a dispense-time gaming voucher image is a gaming voucher image created before or while dispensing a gaming voucher. According to embodiments, the gaming voucher imaging device 214 can create the images according to any suitable image format (e.g., JPEG, bitmap, TIFF, etc.). In one embodiment, the gaming voucher imaging device 214 can compress or encode the dispense-time image. The flow continues at block 608.

At block 608, the dispense-time image is associated with a gaming voucher identifier. For example, the processor 208 associates the dispense-time image with a gaming voucher identifier. The flow continues at block 610.

At block 610, the dispense-time voucher image is stored. For example, a processor 208 of a wagering game machine 402 stores the dispense-time voucher image in the gaming voucher image database 416. In one embodiment, the wagering game machine 402 transmits the dispense-time voucher image to the image server 408, which stores it in the gaming voucher image database 416. In one embodiment, the wagering game machine 402 stores the dispense-time voucher image in a data store located inside the wagering game machine 402 (not shown). The flow continues at block 612.

At block 612, the gaming voucher is dispensed. For example, the gaming voucher printer 212 dispenses the gaming voucher. From block 612, the flow ends.

Figure 7:
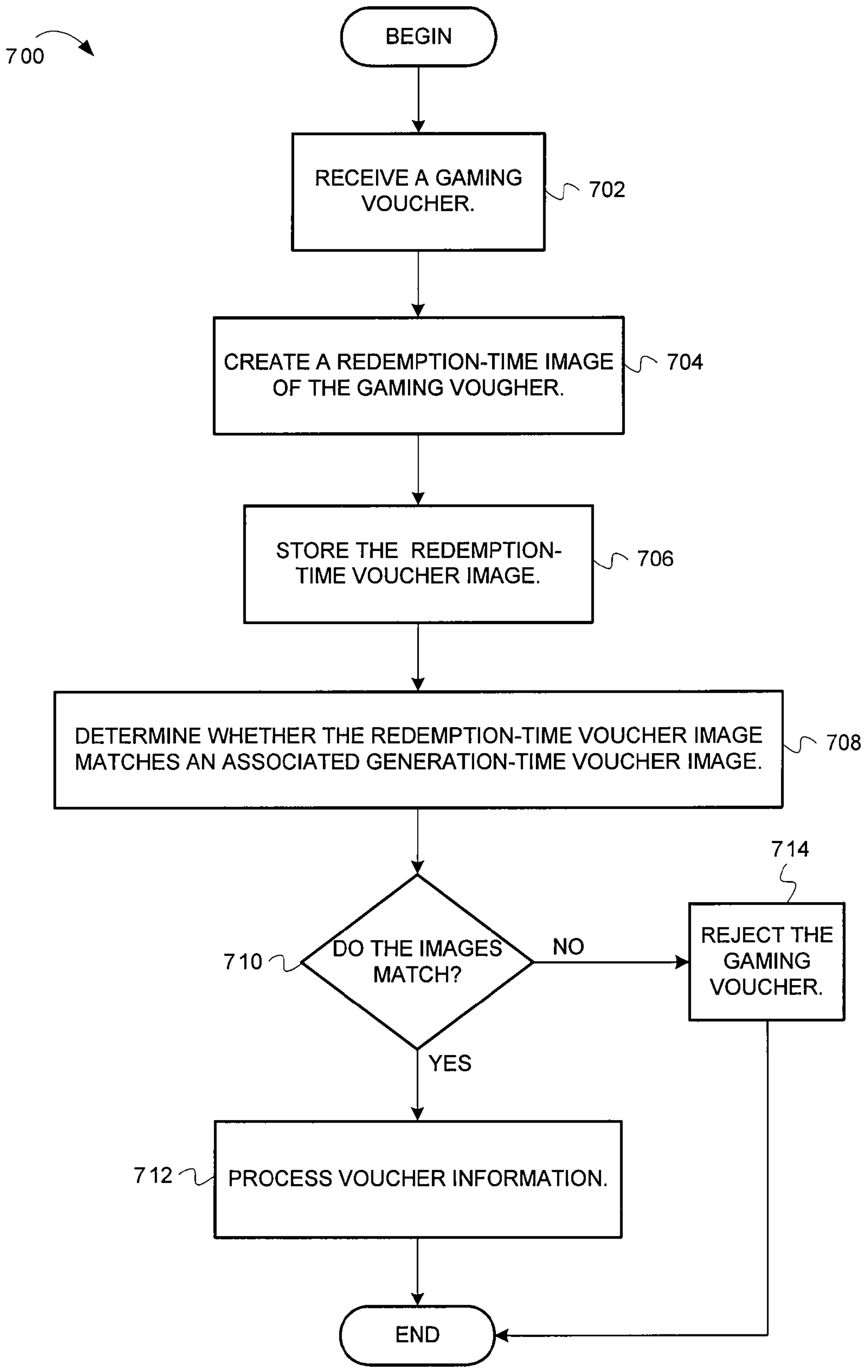
FIG. 7 is a flow diagram illustrating operations receiving and verifying a gaming voucher, according to exemplary embodiments of the invention.

FIG. 7 is a flow diagram illustrating operations receiving and verifying a gaming voucher, according to exemplary embodiments of the invention. The operations of the flow diagram 700 will be described with reference to the exemplary system of FIG. 4. The flow diagram 700 commences at block 702.

At block 702, a gaming voucher is received. For example, a wagering game machine's gaming voucher acceptor 216 receives a gaming voucher from a player. The flow continues at block 704.

At block 704, a redemption-time voucher image is created. For example, the gaming voucher imaging device 218 creates a redemption-time voucher image of the gaming voucher. In one embodiment, a redemption-time gaming voucher image is a gaming voucher image created after a player inserts a gaming voucher into a wagering game machine. The flow continues at block 706.

At block 706, the redemption-time voucher image is stored. For example, a wagering game machine 402 transmits the redemption-time voucher image to the gaming voucher image database 416 for storage. The flow continues at block 708.

At block 708, a determination is made about whether the redemption-time voucher image matches an associated dispense-time voucher image. In another embodiment, the image server 408 can use a voucher identifier included in the redemption-time image for retrieving the associated dispense-time voucher image from the gaming voucher image database 416. In one embodiment, the image server 408 compares the two images and determines whether there is a match. The image server 408 can notify the wagering game machine 402 of its determination.

In another embodiment, the wagering game machine 402 retrieves the associated dispense-time image and compares it with the redemption-time image. Based on the comparison, the wagering game machine 402 determines whether the redemption-time voucher image matches the dispense-time voucher image.

The flow continues at block 710.

At block 710, a determination is made about whether the images match. If the images match, the flow continues at block 712. Otherwise, the flow continues at block 714.

At block 712, voucher information is processed. For example, the wagering game machine 402 processes the voucher information and provides the appropriate number of credits. From block 712, the flow ends.

At block 714, the gaming voucher is rejected. For example, the wagering game machine 402 rejects the voucher. As a result, the gaming voucher acceptor 216 returns the gaming voucher. In one embodiment, as part of rejected a gaming voucher, the wagering game machine 402 notifies security. From block 714, the flow ends.

While the discussion of FIGS. 6-7 describes operations typically performed by wagering game machines, the discussion of FIGS. 8-9 describe data and operations of an image server and/or gaming voucher image database.

FIG. 8 is a diagram illustrating a gaming voucher image database table, according to exemplary embodiments of the invention. In one embodiment, the gaming voucher image database 416 can store gaming voucher image data, as shown in database table 800. The table 800 includes a "voucher_id" field 802 for storing a voucher identifier associated with gaming voucher images. The table 800 also includes a voucher information field 804 for storing information associated with each gaming voucher (see discussion of FIG. 5). Additionally, the table 800 includes a dispense-time image field 806 and a redemption-time image 808 for storing dispense-time and redemption-time gaming voucher images. In one embodiment, the gaming voucher image database 416 stores only one image of the gaming voucher. For example, the gaming voucher image database 416 only stores the dispense-time image.

FIG. 9 is a flow diagram illustrating operations for comparing gaming voucher images, according to exemplary embodiments of the invention. In one embodiment, the operations of FIG. 9 can be performed on the database table described in FIG. 8. The operations of flow diagram 900 will be described with reference to the exemplary system of FIG. 4. The flow diagram 900 commences at block 902.

At block 902, a redemption-time gaming voucher image is received. For example, the image server 408 receives a redemption-time gaming voucher image from a wagering game machine 402. In one embodiment, the redemption-time gaming voucher image includes a gaming voucher identifier. Alternatively, a gaming voucher identifier is received along with the voucher image. In one embodiment, redemption-time gaming voucher image is in a JPEG format. The flow continues at block 904.

At block 904, the redemption-time voucher image is stored. For example, the image server 408 stores the redemption-time gaming voucher in a redemption-time image field 808 of the gaming voucher image database 416. Additionally, the image server 408 stores the gaming voucher identifier in the gaming voucher image database's voucher_id field 802 and the voucher information in the voucher information field 804. The flow continues at block 906.

At block 906, a dispense-time gaming voucher image associated with the redemption-time voucher image is retrieved. For example, the image server 408 retrieves a dispense-time gaming voucher image from the gaming voucher image database 416. In one embodiment, the image server 408 retrieves the dispense-time gaming voucher image associated with the voucher identifier included in the redemption-time image. The flow continues at block 908.

At block 908, the dispense-time and redemption-time gaming voucher images are compared. For example, the image server 408 compares the dispense-time and redemption-time gaming voucher images. According to embodiments, image server 408 compares the images in any suitable matter. For example, in one embodiment, the image server 408 compares data bits of the JPEG files (see FIG. 9). In one embodiment, the image server 408 transmits the comparison results to a wagering game machine 402. From block 908, the flow ends.

Although the image server 408 can be used for comparing gaming voucher images, it can also operate without comparing gaming voucher images. For example, the image server 408 can simply receive gaming voucher images and store them in the gaming voucher image database 416 (see blocks 902 and 904). In one embodiment, gaming regulators or other gaming personnel can use the user interface 406 to inspect data stored in the accounting database 414 and the gaming voucher image database 416. Security personnel may use the user interface 406 in real-time to scrutinize authenticity of paper currency and gaming vouchers received in the wagering game machines 402.

In one embodiment, the operations of FIG. 9 can be performed by a wagering game machine 402. Furthermore, in one embodiment, the database table 800 can be stored in a wagering game machine 402.

General

Although cashless gaming vouchers are well known in the art, other types of gaming vouchers unrelated to cashless gaming have been used to provide players with special game activity related benefits. For example, some wagering game machines will dispense gaming vouchers that provide entry into lottery type games in lieu of a cash award. Other wagering game machines will dispense gaming vouchers that save game status and allow players to stop and resume play at a later time at the same point that the player cashed out of the wagering game machine. This saved status gaming voucher allows a player to play protracted episodic type games. Another example is the use of gaming vouchers, read by the voucher acceptor, that configure wagering game machine. An image of the configuration gaming voucher may be stored in a database to track maintenance activities related to a specific wagering game machine.

Regardless of the purpose of the gaming voucher, whether it be cashless, save the state, configuration, or the provision of additional games unrelated to the wagering game machine, the imaging device described above can be used to capture the images of these vouchers before they are disbursed and immediately prior to their redemption. The security features that are so important for cashless gaming are equally important for these applications.

In this description, numerous specific details are set forth. However, it is understood that embodiments of the invention may be practiced without these specific details.
In other instances, well-known circuits, structures, and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different from those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A method of processing wagers for a wagering game machine, comprising:

capturing an image of a first gaming voucher and storing in a database at a time the first gaming voucher is dispensed at a wagering gaming machine, the first gaming voucher having voucher information including a voucher identifier;

capturing an image of a second gaming voucher having voucher information including a voucher identifier, wherein validity of the second gaming voucher has not been determined;

reading the voucher identifier of the second gaming voucher;

retrieving the image of the first gaming voucher from the database based on the voucher identifier of the second gaming voucher matching the voucher identifier of the first gaming voucher;

comparing the image of the first gaming voucher and the image of the second gaming voucher; and determining in accordance with the comparison the validity of the second gaming voucher.

2. The method of claim 1, wherein the voucher information of the second gaming voucher includes a machine-readable indicia including the voucher identifier, the method further comprising processing the image of the second gaming voucher to identify the voucher identifier contained in the machine-readable indicia.

3. The method of claim 1, further including displaying the image of the second gaming voucher on a user interface.

4. The method of claim 1, wherein the voucher information of the first and second voucher includes a machine-readable indicia including the voucher identifier, and wherein the reading includes reading the machine-readable indicia with a barcode reader to determine the voucher identifier.

5. The method of claim 1, wherein the capturing of the image of the second gaming voucher occurs in any wagering game machine, and wherein the database storing the image of the first gaming voucher is remote from the wagering game machine where the capturing of the second gaming voucher occurred.

6. The method of claim 1, wherein the stored image is used for accounting.

7. The method of claim 1, further comprising:

generating the image of the first gaming voucher; and printing the first gaming voucher with the voucher information.

8. The method of claim 3, further comprising inspecting the image of the second gaming voucher on the user interface to determine the validity of the gaming voucher.

9. The method of claim 1, wherein the voucher identifier of the second gaming voucher is obtained by using optical character recognition.

10. The method of claim 1, wherein the first gaming voucher and the second gaming voucher are the same gaming voucher.

11. A wagering game machine comprising:

a gaming voucher printer to print a first gaming voucher having voucher information including a voucher identifier;

an imaging device for capturing an image of the first gaming voucher;

a processor for generating the voucher information for the first gaming voucher, the processor further for and communicating the voucher identifier and the image of the first gaming voucher to a database for storing the image in association with the voucher identifier at the time the first gaming voucher is dispensed;

the processor further for retrieving the image of the first gaming voucher from the database based on the voucher identifier identified from a captured image of a second gaming voucher matching the voucher identifier of the first gaming voucher; and a gaming voucher image comparison unit to compare the image of the first gaming voucher and the image of the second gaming voucher to determine the validity of the second gaming voucher.

12. The wagering game machine of claim 11, wherein the processor determines the voucher identifier of the second gaming voucher from the captured image of the second gaming voucher.

13. The wagering game machine of claim 11, further including a voucher acceptor, the voucher acceptor for determining the voucher identifier of the second gaming voucher from machine-readable indicia.

14. The wagering game machine of claim 11, wherein the image of the second gaming voucher is a redemption-time image.

15. The wagering game machine of claim 11, wherein the first gaming voucher and the second gaming voucher are the same.

16. A non-transitory machine-readable medium with instructions stored thereon, which when executed by one or more processors, cause the one or more processors to:

capture an image of a first gaming voucher and store in a database at the time the first gaming voucher is dispensed at a gaming machine, the first gaming voucher having voucher information including a voucher identifier;

capture an image of a second gaming voucher having voucher information including a voucher identifier, wherein the validity of the second gaming voucher has not been determined;

read the voucher identifier of the second gaming voucher retrieve the image of the first gaming voucher from the database based on the voucher identifier of the second gaming voucher matching the voucher identifier of the first gaming voucher;

compare the image of the first gaming voucher and the image of the second gaming voucher; and determine in accordance with the comparison the validity of the second gaming voucher.

* * * * *